United States Patent
Hwang

(10) Patent No.: US 6,636,586 B1
(45) Date of Patent: *Oct. 21, 2003

(54) TELEPHONE SET DEVICE CAPABLE OF VOCALIZING A TELEPHONE NUMBER BEING CALLED

(75) Inventor: Bar-Chung Hwang, Taoyuan (TW)

(73) Assignee: Winbond Electronics Corp., Hsnchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,770

(22) Filed: Jan. 21, 1997

(30) Foreign Application Priority Data

Nov. 11, 1996 (TW) ....................... 85217287 U

(51) Int. Cl.⁷ .................. H04M 1/64; H04M 11/00; H04M 3/42
(52) U.S. Cl. ............... 379/67.1; 379/76; 379/82; 379/88.21; 379/156; 379/167.08; 379/177; 379/201.07; 379/93.08
(58) Field of Search ............. 379/67.1, 76, 88.12, 379/80, 82, 88.01, 88.17, 88.03, 88.04, 88.19, 88.22, 88.25, 144, 142, 373, 374, 70, 88.16, 88.21, 93.08, 167.08, 156, 159, 177, 179, 201.207, 207.12

(56) References Cited

U.S. PATENT DOCUMENTS

| | | | | | |
|---|---|---|---|---|---|
| 4,582,957 A | * | 4/1986 | Hayes et al. | ................. | 379/74 |
| 4,582,959 A | * | 4/1986 | Myslinski et al. | ....... | 379/88.12 |
| 4,672,660 A | * | 6/1987 | Curtin | ..................... | 379/88.12 |
| 4,782,510 A | * | 11/1988 | Szlam | ..................... | 379/88.24 |
| 4,817,129 A | * | 3/1989 | Riskin | ......................... | 379/88 |
| 4,894,861 A | * | 1/1990 | Fujioka | ...................... | 379/374 |
| 4,899,358 A | * | 2/1990 | Blakley | ....................... | 379/67 |
| 4,922,519 A | * | 5/1990 | Daudelin | ..................... | 379/67 |
| 4,932,042 A | * | 6/1990 | Baral et al. | ............. | 379/88.24 |
| 5,163,083 A | * | 11/1992 | Dowden et al. | .............. | 379/88 |
| 5,200,994 A | * | 4/1993 | Sasano et al. | .............. | 379/142 |
| 5,220,599 A | * | 6/1993 | Sasano et al. | .............. | 379/142 |
| 5,390,236 A | * | 2/1995 | Klausner et al. | .......... | 379/67.1 |
| 5,394,445 A | * | 2/1995 | Ball et al. | ..................... | 379/67 |
| 5,425,089 A | * | 6/1995 | Chan et al. | ................ | 379/183 |
| 5,481,594 A | * | 1/1996 | Shen et al. | ................. | 379/392 |
| 5,483,577 A | * | 1/1996 | Gulick | .................... | 379/88.01 |
| 5,526,406 A | * | 6/1996 | Luneau | ....................... | 379/61 |
| 5,646,979 A | * | 7/1997 | Knuth | ........................ | 455/563 |
| 5,809,111 A | * | 9/1998 | Matthews | .................... | 379/31 |
| 5,822,402 A | * | 10/1998 | Marszalek | ................... | 379/67 |
| 5,850,435 A | * | 12/1998 | Devillier | .................... | 379/374 |

* cited by examiner

*Primary Examiner*—Allan Hoosain
(74) *Attorney, Agent, or Firm*—Ladas & Parry

(57) ABSTRACT

A telephone set device capable of vocalizing a telephone number being called. A line interface circuit serves as an interface between the tip and ring wires of a standard telephone circuit and the internal circuit. A ring detector detects whether a ring signal is being input. A controller provides the input of signals from the line interface circuit, the keypad, and the ring detector. A hybrid circuit divides the connecting terminals of the line interface into a voice input and a voice output. A keypad inputs the control signal or the number signal to the controller, and sets the address data in the internal memory of the controller to output the voice data. A DTMF generator generates DTMF signals to represent each key on the keypad. A number voice generator receives the address data and decompresses the corresponding compressed voice data retrieved from the internal memory. A handset receives/transmits a voice signal. A switch device cuts off the voice signal from the handset under the control of the DTMF generator when the DTMF generator outputs the DTMF signals. A speaker connected to the number voice generator, vocalizes the decompressed voice signal.

10 Claims, 3 Drawing Sheets

TELEPHONE SET DEVICE CAPABLE OF VOCALIZING A TELEPHONE NUMBER BEING CALLED

FIELD OF THE INVENTION

The present invention relates to telephone set devices, and, more particularly, relates to telephone set devices capable of vocalizing the telephone extension number being called when the telephone rings.

DESCRIPTION OF THE RELATED ART

As is well known in the prior art, the ringer of a telephone is made of coils and a metal bell. It has the disadvantages of large size and heavy weight. To overcome these disadvantages, instead of traditional ringers, most telephone set manufacturers use telephone integrated circuits (ICs) which are in small size, light weight, and which can be adapted to circuit boards. This kind of IC ringer is more popular with users due to its sweet ringing sound, although the ring volume of this IC ringer is lower than that of a mechanical ringer.

Nowadays, the ringer of the IC ringer telephone set is emitted from the speaker or the buzzer of the telephone set. The volume and tone of this kind of ringer can be adjusted. However, when many telephone extensions are installed in close proximity at a location, for example in an office, sometimes many people simultaneously search for a ringing telephone set since it is difficult to identify which particular one is ringing. Moreover, when a telephone rings, the activities of all those hearing the ringing are interrupted.

FIG. 1 shows a basic configuration of a conventional ringer circuit. The basic configuration of the ringer circuit includes: ring IC 10, buzzer 20, several resistors, and several capacitors. Ring IC 10 can be a dual-frequency oscillator. Resistor 21 and capacitor 22 can be used to control the oscillating frequency. Generally all prior art ring circuits typically have a basic configuration similar to the one shown in FIG. 1. When the ring signal is input, the ring circuit can only request a ring tone or allow for the adjustment of the volume or frequency of the ring. In fact, the telephone sets used in an office are typically the same kind, the tones of the telephone sets thus being very similar. This makes it difficult for the users to be able to identify which specific telephone is ringing.

SUMMARY OF THE INVENTION

The present invention provides a telephone set device which is capable of vocalizing the telephone number being called. The present invention utilizes voice synthesizing technology to pre-store in the ring IC the data representative of the sound of the numbers and words defined by the users. Therefore, when the ring signal is input ton the telephone set, the telephone set can recite the sound of the telephone number and particular words along with the ringing, or alternatively only the telephone number and particular words. As a result, users can easily identify which telephone is being called.

In particular, a telephone set device capable of vocalizing a telephone number being called of the present invention includes: line interface circuit, serving as an interface between the tip and ring wires of a standard telephone circuit and the internal circuit; ring detector for detecting whether a ring signal is being input; controller, providing input ports for the signals output from line interface circuit, keypad, and ring detector, wherein when ring detector detects an input ring signal, and transmits a signal to controller, and controller outputs a corresponding address data pre-stored in the internal memory to number voice generator; hybrid circuit for dividing the connecting terminals of the line interface into a voice input and a voice output; ring tone generator for outputting the ring tone under the control of ring detector; keypad for inputting the controlling ring or the number signal to the controller, and for setting the address data in an internal memory of controller to output the voice and ring tone set by users with the usage of the specific keys and the number keys; DTMF generator for generating DTMF signals to represent each key on keypad; number voice generator for receiving the address data from controller, and decompressing the compressed voice data retrieved from the internal memory into voice signals; amplifier for amplifying and outputting the ring tone signal from ring generator and the words from number voice generator to speaker; which device for cutting off the voice signal from the handset under the control of DTMF generator when DTMF generator outputs a DTMF signal; handset for receiving/transmitting voice respectively with a receiver, such as an earphone, and a transmitter, for example a microphone; and speaker, connected to amplifier, for vocalizing the decompressed

DESCRIPTION OF THE DRAWINGS

In all figures, all the same elements or devices are labeled by the same reference numbers.

DESCRIPTION OF THE PREFERRED EMBODIMENT

Figure 1:
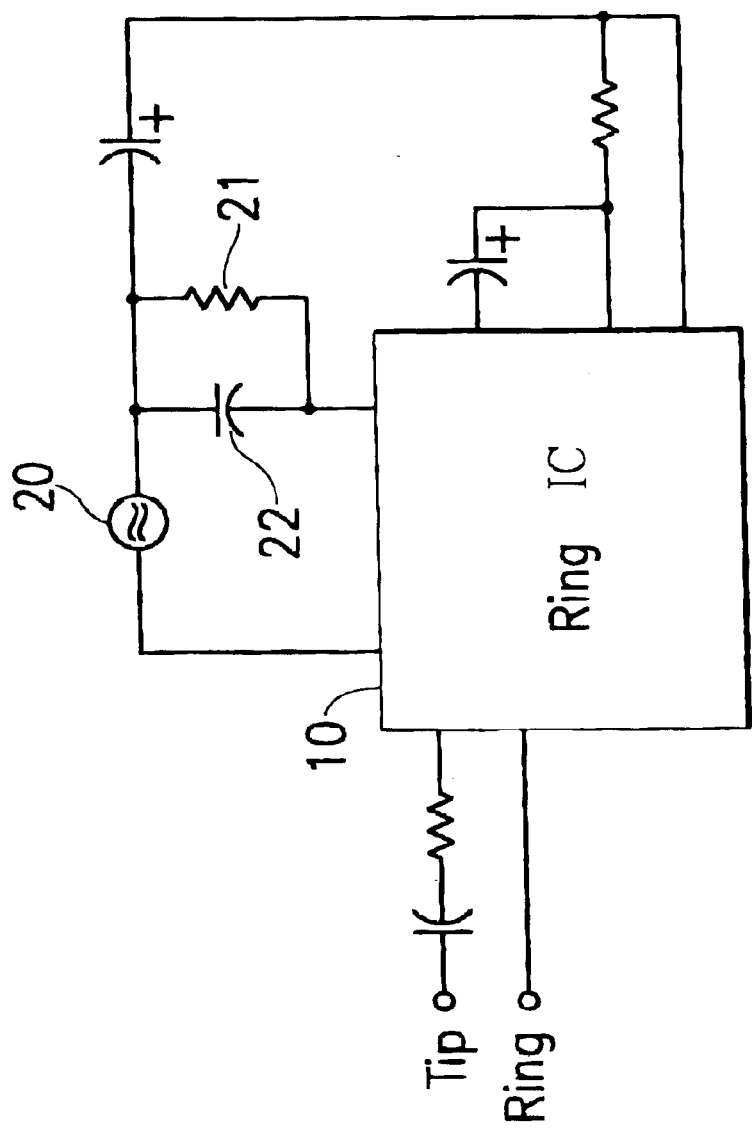
FIG. 1 shows the basic configuration of a ring circuit known in the prior art.
Figure 2:
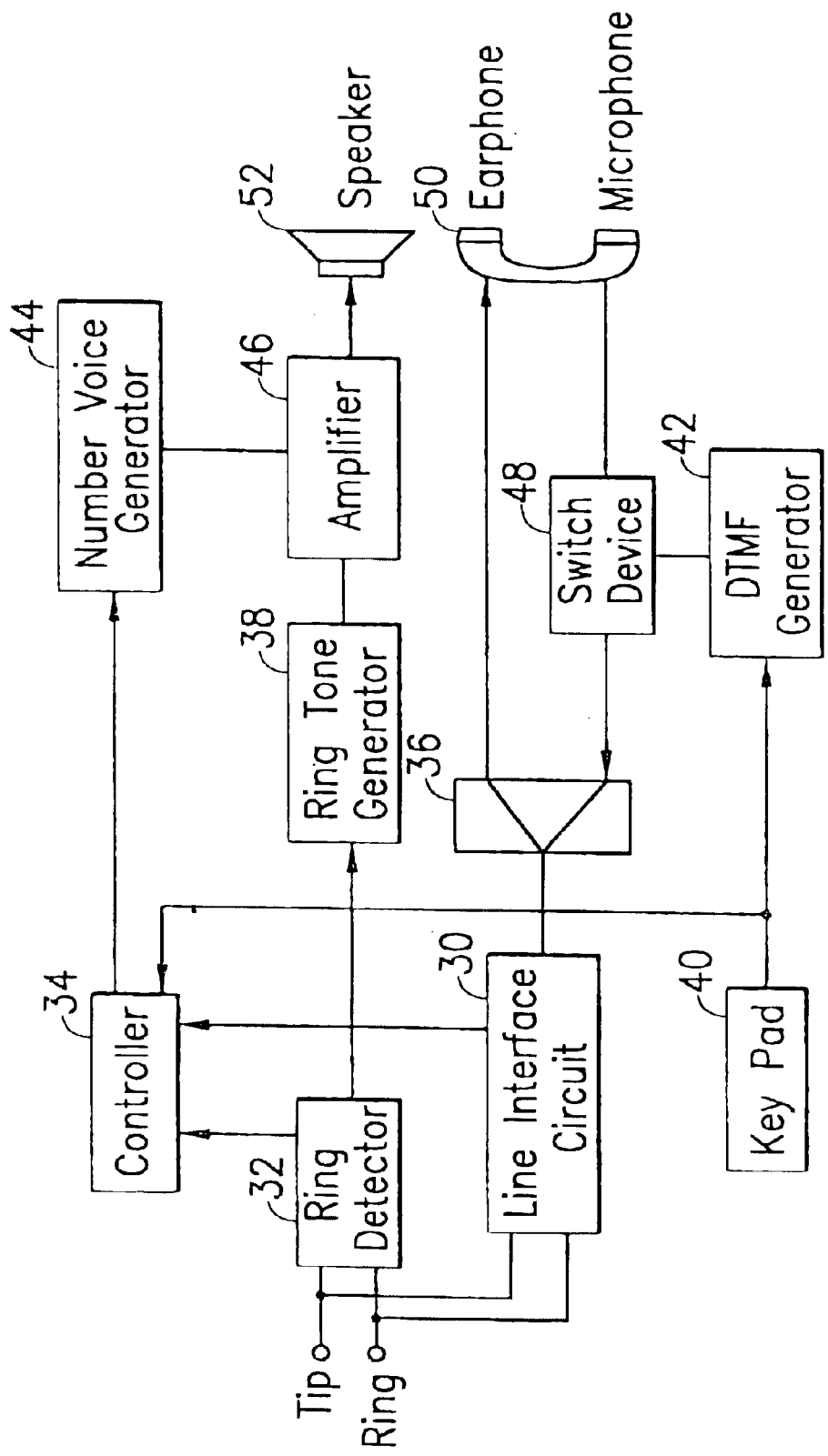
FIG. 2 shows one embodiment of the telephone set device in accordance with a telephone set device capable of vocalizing a telephone number being called in accordance with the present inventin.

As shown in FIG. 2, one embodiment of the telephone set device for vocalizing the telephone number of the present invention includes: line interface circuit 30, serving as an interface between the tip and ring wire of a standard telephone circuit and the internal circuit; ring detector 32 for detecting whether a ring signal is being input; controller 34, providing input ports for the signals output from line interface circuit 30, keypad 40, and ring detector 32, wherein when ring detector 32 detects an input ring signal, and transmits a signal to controller 34, and controller 34 outputs a corresponding address data pre-stored in the internal memory to number voice generator 44; hybrid circuit 36 for dividing the connecting terminals of the line interface into a voice input and a voice output; ring tone generator 38 for outputting the ring tone under the control of ring detector 32; keypad 40 for inputting the controlling signal or the number signal to the controller, and for setting the address data in an internal memory of controller 34 to outputs the voice and ring tone set by users with the usage of the specific keys and the number keys; DTMF generator 42 for generating DTMF signals to represent each key on keypad 40; number voice generator 44 for receiving the address data from controller 34, and decompressing the compressed voice data retrieved from the internal memory into voice signals; amplifier 46 for amplifying and outputting the ring tone signal from ring generator 38 and the words from number voice generator 44 to speaker 52; switch device 48 for cutting off the voice signal from the handset under the control of DTMF generator 42 when DTMF generator 42 outputs a DTMF signal; handset 50 for receiving/transmitting voice respectively with a receiver, such as an earphone, and a transmitter, for example a microphone; and speaker 52, connected to amplifier 46, for vocalizing the decompressed voice signals.

When implementing the above described circuit of the present invention, some elements, such as the controller, the ring detector, the ring tone generator, and the DTMF generator can be integrated as an IC. Regarding the number voice generator employing the voice synthesizing technology, the voice IC W528X produced by the Winbond Electronics Corp. can be used as the number voice generator of the present invention. Furthermore, it can be combined with the telephone IC in a single chip.

The telephone set device capable of vocalizing the telephone numbers of the present invention stores the data of voice number and some words in advance, for example "extension", "number", "called", in the telephone IC. The users can set the telephone numbers or the brevity codes by inputting the controlling numbers to the telephone keypad. For example, a telephone extension number "7446" can be set by sequentially inputting "#", "7", "4", "4", "6", and "#". When a telephone ring signal inputs, the speaker of the telephone set not only repeatedly rings, but also vocalizes the expression 7446" until the handset is taken off-hook, or the caller hangs up.

Figure 3:
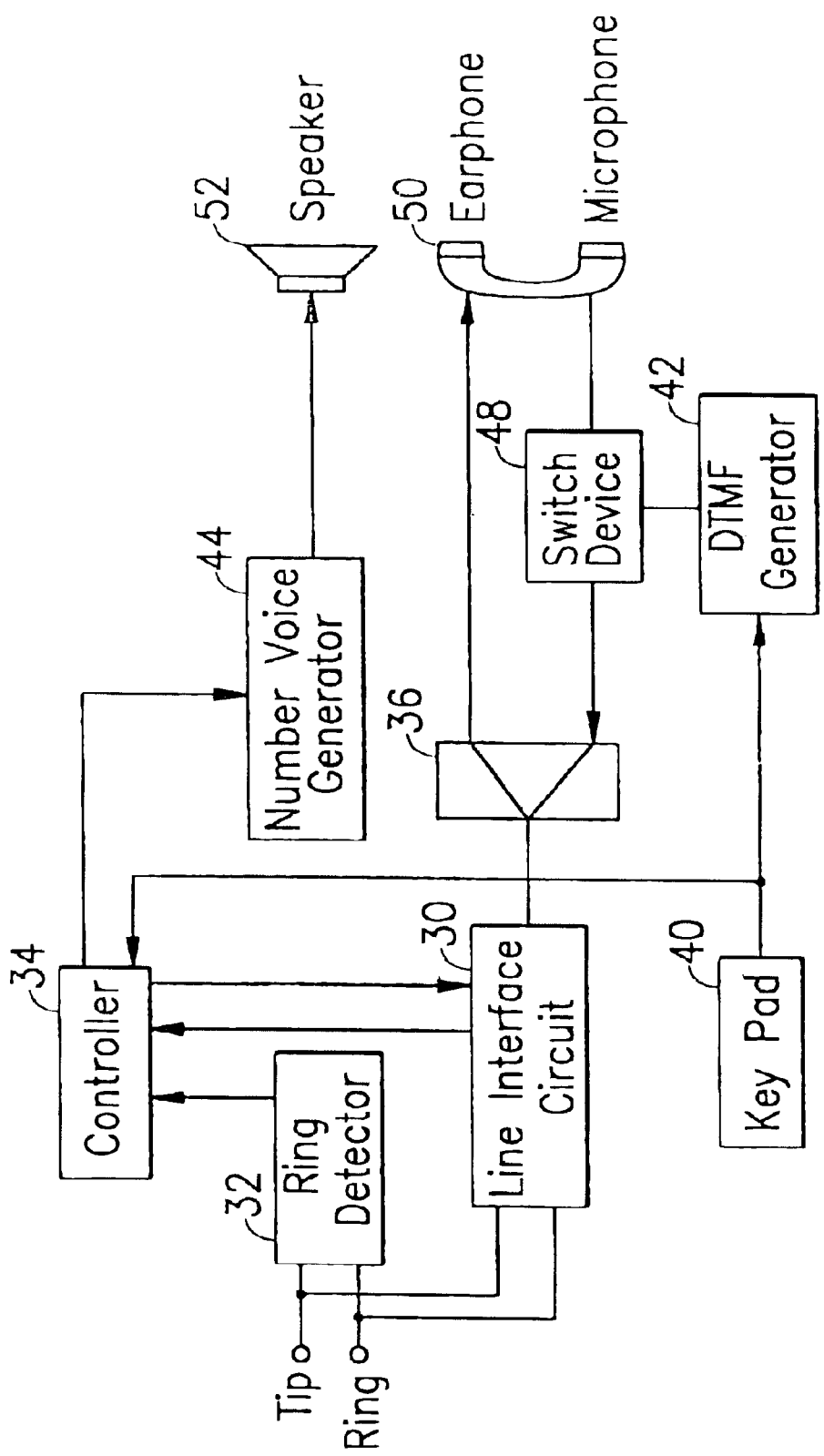
FIG. 3 shows another embodiment of the telephone set device capable of vocalizing a telephone number being called in accordance with the present invention.

As shown in FIG. 3, another embodiment of the present invention directly uses number voice generator 44 to replace ring voice generator 38. When ring detector 32 detects an input ring signal, it transmits a controlling signal to controller 34. Then, controller 34 transmits the address signal preset and pre-stored in the internal memory to number voice generator 44. Number voice generator 44 retrieves the compressed voice data corresponding to the address signal from the memory, decompresses them to generate a voice signal and outputs the voice signal through speaker 52. In other words, the compressed voice data of ring tone, telephone number, and several words can be pre-stored in the internal memory of the number of voice generator. The users can set the recitation order as needed, or use a default order.

What is claimed is:

1. A telephone set device capable of reciting a telephone number being called, comprising:
   a line interface circuit for acting as an interface between a tip and ring wires of a standard telephone circuit, and an internal circuit;
   a ring detector for detecting whether a ring signal is being input, and outputting a detection signal when the ring signal is detected;
   a keypad for presetting a telephone number associated with the telephone set on which the keypad is disposed by providing number signals corresponding to the telephone number and control signals, the presetting being done by using a plurality of number keys and specific keys;
   a controller for:
   (a) receiving the number signals and control signals from the keypad when presetting the telephone number associated with the telephone set;
   (b) generating information data corresponding to the number signals and control signals;
   (c) storing the information data in an internal memory; and
   (d) transmitting the information data when receiving the detection signal;
   a number voice generator for receiving the information data, and decompressing the information data for generation of voice signals corresponding to the telephone numbers being called; and
   a speaker, connected to the number voice generator, for reciting the decompressed voice signals before the telephone set goes off-hook.

2. The telephone set device of claim 1, further comprising:
   a ring tone generator for outputting a ring tone under the control of the ring detector; and
   an amplifier for amplifying and outputting the ring tone signals from the ring generator and the words from the number voice generator to the speaker.

3. The telephone set device of claim 1, wherein the number voice generator comprises a memory for storing the information data.

4. The telephone set device of claim 3, wherein the information data comprises ring tone data, voice data for telephone numbers, and several words.

5. The telephone set device of claim 2, wherein the ring detector drives the ring generator to produce a ring voice signal, and then makes the controller output the address signal to drive the number voice generator to output the voice signal while detecting the input of the ring signal.

6. A telephone set capable of reciting a telephone number being called, comprising:
   a line interface circuit for acting as an interface between a tip wire and a ring wire of a standard telephone circuit, and an internal circuit;
   a ring detector for detecting whether a ring signal is being input, and outputting a detection signal when the ring signal is detected;
   means for presetting a telephone number associated with the telephone set;
   a controller receiving the telephone number associated with the telephone set, generating information data corresponding to the telephone number, storing the information data in an internal memory, and transmitting the information data when receiving the detection signal;
   a number voice generating the information data transmitted by the controller and decompressing the information data to generate voice signals corresponding to the telephone number being called; and
   a speaker connected to the number voice generator and receiving the voice signals, the speaker outputting the voice signals reciting the telephone number being called before the telephone set goes off-hook.

7. The telephone set of claim 6, further comprising:
   a ring tone generator for outputting a ring tone under the control of the ring detector; and
   an amplifier for amplifying and outputting the ring tone signals from the ring generator and words of voice signals from the number voice generator to the speaker.

8. The telephone set of claim 7, wherein the ring detector drives the ring tone generator to produce a ring voice signal, and the ring detector then controls the controller to output an address signal to drive the number voice generator to output the voice signals while detecting the input of the ring signal.

9. The telephone set of claim 7, wherein the information data comprises ring tone data, voice data for one or more telephone numbers, and several words.

10. The telephone set of claim 6, wherein the number voice generator comprises a memory for storing the information data.

* * * * *